United States Patent [19]

Forrest

[11] 4,044,183
[45] Aug. 23, 1977

[54] SYNTHETIC SUEDE AND PROCESS THEREFOR

[76] Inventor: Norman Forrest, 216 Byram Road, Byram, Conn. 10573

[21] Appl. No.: 738,918

[22] Filed: Nov. 4, 1976

[51] Int. Cl.$^2$ .................... D06C 11/00; B32B 33/00
[52] U.S. Cl. ............................. 428/91; 156/72; 156/153; 156/154; 156/285; 156/306; 156/311; 156/324; 428/95; 428/315; 428/425
[58] Field of Search ............... 428/91, 95, 315, 425; 156/72, 153, 154, 244, 285, 306, 311, 324; 264/162

[56] References Cited

U.S. PATENT DOCUMENTS

| | | | |
|---|---|---|---|
| 3,794,548 | 2/1974 | Wirth | 428/91 |
| 3,861,937 | 1/1975 | Hanneken | 428/91 |

*Primary Examiner*—Marion E. McCamish
*Attorney, Agent, or Firm*—Lawrence Rosen; E. Janet Berry

[57] ABSTRACT

Process for preparing a synthetic suede product from three or more separate layers of non-fibrous materials welded together: two outer layers with outwardly extending polyurethane fibers and at least one inner layer of polyurethane film, sheet, web, or foam. The process comprises continuously feeding at least three separate films, sheets or webs of the appropriate non-fibrous feed materials into the nip formed by two rotating, heated cylinders wherein the feed materials are contacted under pressure with two heated flexible molding bands provided with a multiplicity of molding cavities whereby outwardly extending fibrous polyurethane surfaces are formed and wherein the separate layers are welded together. The novel synthetic suede product obtained by this process is also disclosed and claimed.

13 Claims, 3 Drawing Figures

(CROSS SECTION AT NIP 18)

(CROSS SECTION AT 27)

SYNTHETIC SUEDE AND PROCESS THEREFOR

The present invention relates to a process for preparing an improved synthetic suede product having two outer polyurethane layers provided with outwardly extending fibers, and to the suede product formed thereby. More particularly, the sandwich-type suede product prepared by this process has at least one inner layer of separate material to furnish the appearance and feel characteristic of genuine leather suede used in the manufacture of garments.

BACKGROUND OF THE INVENTION

There have been many attempts in recent years to produce a commercially acceptable synthetic suede-like product. Such materials have been sought primarily for the manufacture of various garments such as dresses, suits, rainwear, and the like. Natural suede has been used for such purposes, but it is a relatively expensive material and often represents the major portion of the costs of making the garments. Moreover, natural suede has the disadvantage of readily showing dirt or other spots on its surface and therefore requires constant cleaning and brushing to maintain its attractive appearance. Natural suede is also easily stained, and such stains are difficult if not impossible to remove without damaging the original appearance and feel.

Some of the process proposed heretofore for the preparation of synthetic suede are described in U.S. Pat. Nos. 2,835,607; 3,098,263; 3,141,051; 3,190,947; 3,316,592; 3,655,497; and 3,705,226. The prior art processes have a number of serious disadvantages; the main problem in most instances being the failure of the synthetic suede product to have properties which are sufficiently similar to natural suede so that the consumer is satisfied. In other instances, the processing procedures are so complicated and involved that the final synthetic product is as expensive, if not more expensive, than natural suede. A number of the prior art processes have the disadvantages of requiring the use of expensive apparatus and/or a large number of processing steps.

U.S. Pat. No. 3,705,226 which pertains to a method for preparing the so-called "Ultrasuede" involves a relatively large number of processing steps, chemical impregnations, and solvent treatments. It would be desirable therefore to have a process available for producing a comparable synthetic suede product which did not require so many processing steps, chemical impregnations, and solvent treatments.

The known synthetic suede products generally are prepared by forming a woven or non-woven substrate from fibrous or textile materials; coating said substrate with a solution, plastisol or film of plastic material; and then fiberizing the resulting adherent coating by such conventional means as sueding, brushing, grinding, napping, shearing, etc.

One object of the present invention is to provide an improved process for the manufacture of synthetic suede which avoids disadvantages of the prior art processes.

Another object of the present invention is to provide a continuous process for the manufacture of synthetic suede by a series of sequential steps that do not include chemical and/or solvent treatments.

A further object of the present invention is to provide an outstanding synthetic suede product having surfaces with outwardly extending, non-tapered fibers and body characteristics having the hand, drape, moderate yield and slow recovery qualities normally associated with genuine leather suede.

A still further object of the present invention is to provide a synthetic suede product prepared from non-fibrous and non-textile feed materials.

These and other objects of the present invention are achieved by the discovery that an improved synthetic suede product can be manufactured in a continuous manner by supplying at least three separate non-fibrous, non-textile feed materials into the nip formed by two rotating, heated cyclinders carrying two endless, flexible molding bands provided with a multiplicity of minute molding cavities. Two of the feed materials are polyurethane films or sheets which form the outer layers of the product and from which outwardly extending fibers are produced by the molding cavities. The other feed material may be a polyurethane film, sheet, web or foam. The latter feed material forms the inner layer of the improved suede product of this invention. The three or more separate feed materials are welded together under elevated temperatures and pressures while being passed through the nip. At the same time, the outer polyurethane components in the feed material are in a molten or semi-molten condition and a portion thereof flow into the cavities of the molding bands to form the outwardly extending fibers or hairs on both outer surfaces, i.e., the stop and bottom surface layers of the composite assembly.

These features of the invention will be best understood from the following description of one type of apparatus suitable for carrying out the process of this invention as shown in the accompanying drawing in which.

Figure 1:
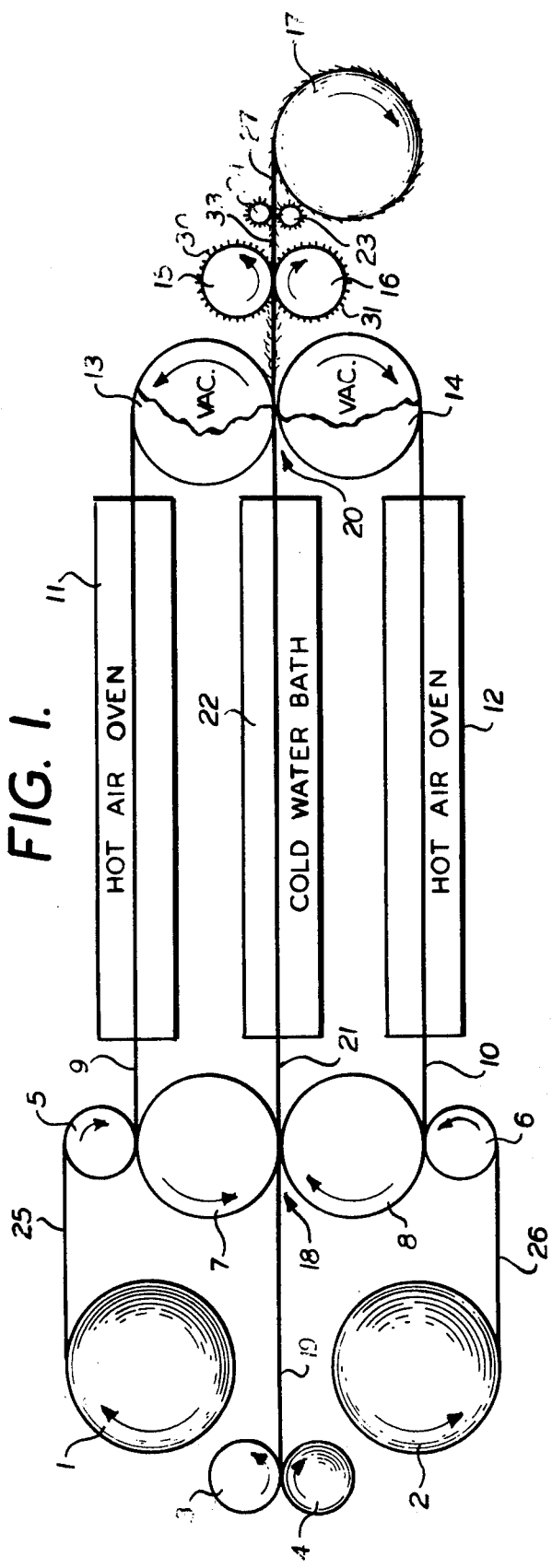
FIG. 1 is a diagrammatic elevational view of apparatus for carrying out the invention.

Referring to FIG. 1, two unsupported and non-reinforced silicone rubber molding bands 9 and 10, which are preferably unsupported and non-reinforced, are shown. The outer surfaces of molding bands 9 and 10 are specially prepared to provide a multiplicity of minute cavities (not shown) for forming the fibrous, suede-like surface of the resulting synthetic product. The cavities are about 0.030 inch deep with a diameter of about 0.001 inch and are somewhat slanted in different directions relative to the outer surfaces of molding bands 9 and 10. The cavities may number about 20,000 or more per square inch.

Molding bands 9 and 10 are positioned over rotating cylinders 7 and 8, respectively, on one end and on rotating cylinders 13 and 14, respectively, on the other end. All four cylinders are power driven. Cylinders 7 and 8 are heated internally to a temperature of about 400° F by means of a hot oil source (not shown) to ensure retention of the precise molding temperature and to provide. It is also possible to provide suitable means such as a weighted roll (not shown) to compensate for the expanison of the molding bands when exposed to heat as well as to insure that the molding bands are kept tracking properly.

Two rolls of unsupported polyurethane film, 25 and 26 are fed from rolls 1 and 2 respectively, and passed over preheating cylinders, 5 and 6, which are internally heated with hot oil by suitable means (not shown) to a temperature of about 400° F. Cylinders 5 and 6 are preferably covered with a material such as tetrafluoroethylene fluorocarbon resins or fluorinated ethylenepropylene resins sold under the trademark Teflon to prevent sticking. Cylinders 5 and 6 act as applicating rolls to press polyurethane films 25 and 26 against preheated molding bands 9 and 10, respectively. Molding bands 9 and 10 are preheated to a temperature of about 385° to 410° F. by passage through conventional hot air ovens 11 and 12 respectively.

As the polyurethane films 25 and 26 are passed around cylinders 7 and 8 respectively, into nip 18 formed by cylinders 7 and 8, a polyurethane film 19 is unwound from a roll 4 and also fed into nip 18. The polyurethane film 19 is preheated to a temperature of about 385° to 410° F. by any suitable means (not shown) and fed into nip 18 between polyurethane films 25 and 26.

In nip 18 the resulting composite layers of the three separate feed material are squeesed at a moderate pressure of from about 65 to 100 psi. At this point the polyurethane films are in a molten condition and a portion thereof flow into the cavities on the outer surfaces of molding bands 9 and 10. As a result of the pressure at nip 18 molten outer polyurethane feed material fill the cavities to form exact replicas of the cross section depth and slant of the fibers which exist on the material from which the cavity surfaces were formed on the molding bands.

Following passage of the composite feed materials through nip 18, the resulting layered product 21, sandwiched between molding bands 9 and 10, is passed through water bath 22 to lower the temperature of the complete assembly to a temperature of from about 72° to 100° F.

When the complete assembly, i.e., molding bands 9 and 10 and layered product 21, reaches nip 20 formed by rotating cylinders 13 and 14, the latters internal vacuum holds molding bands 9 and 10 tightly against the outer surfaces of cylinders 13 and 14 respectively, which facilitates the subsequent stripping operation. Cylinders 15 and 16, which are covered with card clothing, grip the resulting synthetic product with fibrous surfaces 27 and strip the mulitplicity of fibers from the matrices of molding bands 9 and 10. If cylinders 13 and 14 are not provided with internal vacuums, the stripping force would pull the molding bands off cylinders 13 and 14 and tear them.

Stripping cylinders 15 and 16 are geared together with the carding staples 30 and 31 arranged to penetrate synthetic product 27 from both directions gripping product 27 positively and at the same time perforating the polyurethane film surfaces with a multiplicity of tiny holes to provide greater breathability than unperforated polyurethane and to enhance water vapor transmission.

The resulting perforated synthetic suede product 33 is next brushed by tampico brushes 23 and 24 to brush the surface fibers over any holes that may be visible as a result of the perforation treatment at cylinders 15 and 16, and then wound on roll 17.

Figure 2:
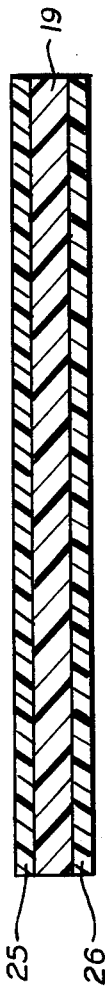
FIG. 2 is a cross-sectional view of the welded product formed in the nip and prior to the flow of the molten polyurethane into the cavities of the two molding bands.

FIG. 2 shows a cross-sectional view of the welded assembly 21 of the feed materials at the time of pressing at the nip 18 comprising the outer polyurethane films 25 and 26 and the inner polyurethane film 19. It will be understood that this cross-sectional view does not show that portion of the molten outer polyurethane films that may have flowed into the multiplicity of cavities provided in the contacting surfaces of molding bands 9 and 10.

Figure 3:
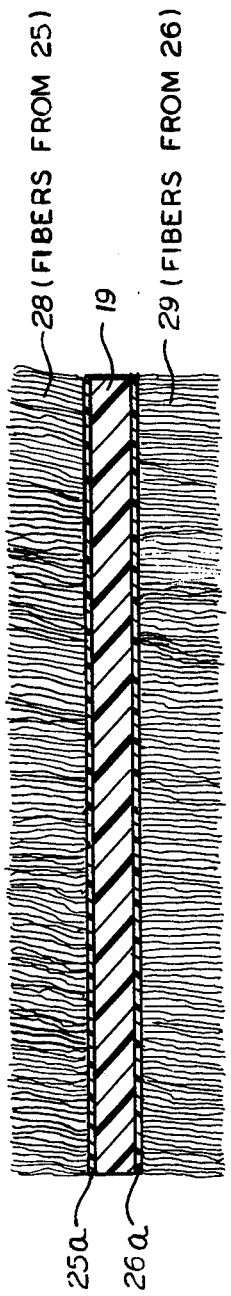
FIG. 3 is a cross-sectional view of the synthetic suede product produced by the process of this invention.

FIG. 3 shows a cross-sectional view of the endless synthetic suede product 27 produced in accordance with the process of this invention after being brushed. Fibers 28 and 29 are obtained from polyurethane film 25 and 26, respectively, non-fibrous outer polyurethane films are indicated by 25a and 26a; and the inner layer is the polyurethane film 19. It will be understood that the mulitplicity of perforations caused by carding staples 30 and 31 are not shown in this cross-sectional view.

The two endless molding bands employed in the above described apparatus for carrying out the process of the present invention are composed of a tough, tear resistant silicone rubber such as those commercially available under the tradenames RTV 664 manufactured by General Electric and Silastict manufactured by Dow-Corning. The molding bands are individually formed by centrifuging a measure amount of precatalyzed silicone rubber inside a steel drum the inside surface of which is covered with a length of coated nylon equivalent in length to the length of molding band desired. The exposed surface of this material is provided with flocked fibers of, for example, 5.5 denier rayon about 0.03 to 0.4 inch in length. These flocked fibers are applied to the surface of the material by conventional electrostatic and beater bar procedures. The molding bands useful in the practice of this invention will have a Shore Hardness value of from about 60 to 73, preferably approximately 70, as measured by a durometer.

The centrifuging step is carried out by initially admixing RTV 664A and RTV 664B silicone rubbers, dispensing the resulting mixture inside a balanced steel drum with open sides, and then certrifuging at a peripheral speed of about 1200 feet per minute for 24 hours. The amount of silicone rubber or rubbers employed will be at least sufficient to produce a finished molding band measuring about 0.05 inch in thickness. This centrifuging method permits the use of a tough silicone rubber, which must be precatalyzed in order to effect polymerization; allows for the release entrapped air from the silicone rubber without using a vacuum; and yields an endless molding band or belt, with no seams or join marks, having a precise thickness.

In accordance with one feature of the invention it has been found essential to have the thickness of the silicon molding bands at an absolute minimum in order to achieve commercially acceptable speeds. The mass of the silicone rubber molding bands is very important, since the heat transfer of the silicone rubber is poor and this will determine the length of the machine as well as the speed of production in carrying out the process which involves both heating and cooling steps. The thickness of the molding bands should therefore range from about 0.035 to 0.055 inch, which will be about 0.005 to 0.015 inch thicker than the length of the surfacefibers being molded. Preferably, the thickness of the molding band should be approximately 0.05 inch which is about 0.01 inch thicker than the length of the fibers.

It has also been found that in order to attain the commercially acceptable speed of about 6 yards per minute no reinforcement can be employed in conjunction with the silicone rubber. If the back of the molding band is reinforced, the molding band will warp excessively due to the expansion of the patterned surface. If a central reinforcement is employed to avoid such warping, an equal amount of the silicone rubber must be cast on the back thereof to equalize the expansion and keep the molding band or belt flat. Such an expedient doubles the weight of the silicone rubber and undesirably reduces production speed at least 50 percent.

The diameter of the molding bands may range from about 8 to 24 feet, and preferably about to 12 to 14 feet. Although the diameters may very depending upon the type of production sought, in general diameters greater than about 12 feet would require apparatus beyond 18 feet long which is impractical in most instances from a commerical standpoint. The width of the molding bands will generally range from about 36 to 72 inches, preferably from about 48 to 64 inches.

As will be understood, the speed of the two silicone rubber molding bands are synchronized and will move at a rate of at least 6 yards per minute. Although the maximum speed will vary greatly depending upon the apparatus employed, a speed of greater than about 10 yards per minute would not provide sufficient time for the requisite prehearing and cooling treatments. The polyurethane film which is employed as the outer or surface layers of the synthetic suede product of this invention are preferably of the polyester based thermoplastic type characterized by a very tough abrasion resistant and semi-rigid composition. Examples of such materials include the Tuftane polyester based polyurethanes sold by the B. F. Goodrich Co. Specific examples of such material are Tuftane 310, Tuftane 312, Tuftane 322, and Tuftane 330. Other polyester based polyurethane film manufactured by the B. F. Goodrich Co. are sold under the Estane brand name. Films or sheets made from Hi-TUFF polyurethane sold by J. P. Stevens & Co. may also be utilized for this purpose. In general, the polyurethane film will have a width in the range of about 36 to 77 inches, preferably from about 56 to 64 inches. A thickness of about 0.004 inch is especially preferred. For most purposes the width of the polyurethane will be substantially the same as the molding bands. The polyurethane films will generally be preheated to a temperature within the range of about 385° to 410° F.

At least 50% of the original thickness of the outer or surface polyurethane films become the fibers or "hairs" of the final synthetic suede product of this invention. Thus, for example, with polyurethane film feed material having a thickness of 0.004 inch as much as about 0.0035 inch thereof will become the surface fibers.

As described above, at least one separate feed material is fed to the nip between the two outer polyurethane films. The former serves as the inner layer of the product of this invention. This feed material is a film, sheet or web of polyurethane having very soft, flacid characteristics; polyurethane foam; and the like. The use of a polyurethane film is preferred, and an example of a commercially available material that can be used for this purposeis manufactured by B. F. Goodrich Chemical Company under the trademark Tuftane 110 and 410, which are polyether based thermoplastic polyurethane films. An example of a useful polyurethane foam is Niax foam sold by the Union Carbide Corporation. The polyurethane film used for this purpose will generally have a thickness of from about 0.001 to 0.004 inch. If a polyurethane foam is employed the thickness will vary from about 0.01 to 0.06 inches.

The width of the inner layer of layers will be substantially the same as the two outer polyurethane layers. In addition, the inner or central layer is preheated to a temperature of from about 385° to 410° F. prior to being passed into nip 18 to ensure that it becomes welded to the two outer polyurethane films.

The rate of feeding the outer and inner layers to nip 18 is synchronized with the speed of the molding hands to provide a continuous flow of the three separate feed materials to nip 18. It would also be possible to prejoin the layers of feed material in a separate machine at higher speeds and then to heat the preformed composite as described below to obtain the synthetic suede product of this invention.

As also previously described, the molding bands are heated to a temperature of from about 385° to 410° F. prior to contacting the feed materials. This preheating step can be carried out using conventional hot air ovens for each molding band. Following passage through nip 18 and while containing the compressed feed materials, the molding bands are cooled to a temperature at least sufficient to solidify the layered assembly and the surface fibers, the latter being still in molding bands. This cooling can be readily accomplished by passing the molding bands through a cold water bath maintained at a temperature of from about 32° to 50° F.

After being withdrawn from the cold water bath the resulting compressed assembly of feed materials containing surface fibers is stripped from the molding bands by the use of a pair of power driven cylinders covered with card clothing. The stripping cylinders are geared together with the carding staples penetrating the synthetic suede assembly from both directions thereby gripping the suede assembly. As previously discussed the carding staples perforate the assembly with a multiplicity of minute holes which enhance the breathability of the final product. The carding staples preferably are about 0.125 to 0.250 inch in length and are positioned substantially perpendicular from the surface of cylinders 15 and 16. The density of the staples will be about 150 to 300 per square inch. In accordance with the description of the process of this invention set forth above the stripping operation is faciliated by maintaining power driven cylinders 13 and 14 under an internal vacuum. The degree of vacuum will vary from about 6 to 24, perferably from about 10 to 20 inches of mercury.

Prior to being wound on a suitable power driven cylinder the resulting synthetic suede product of this invention may be subjected to a separate brushing treatment to ensure the surface fibers or hairs cover the minute perforations that may be visible. It will be understood however, that the brushing step is not essential or may be carried out in a separate operation just prior to commercial use of the suede product. When brushing is desired it may be accomplished by the use of a pair of tampico brushes. Other available procedures may obviously be employed to brush the surface fibers prior to wind-up.

The synthetic suede product of this invention is characterized by outstanding abrasion resistance and highly desirable tracking and lay down of the surface fibers or hairs when a finger is moved across the surface thereof as in the finest genuine suede made of unborn calf skins. The diameters and length of the surface fibers will generally vary from about 0.0005 to 0.0015 inch and from about 0.0010 to 0.050 inch, respectively. The relative stiffness of the outer polurethane film feed materials is also important. If a softer polyurethane material is employed the fibers would feel gummy and would not stand up or track. Furthermore, the use of a softer polyurethane film feed material would give surface fibers which would tend to pill. On the other hand, if the polyurethane film feed material is too stiff the resulting surface fibers or hairs would be undesirably harsh to the touch.

The synthetic suede product or layered assembly of this invention also will have the following characteristics:

| | |
|---|---|
| Density of Surface Fibers, Average | 10,000 to 100,000 per square inch |
| Thickness, Average | 0.008 to 0.060 inch |
| Width | 36 to 65 inches |

In accordance with another feature of the present invention the inner layer may comprise lace-like polyurethane, non-woven polyurethane fibers, or spunbonded spandex such as sold by the Inmont Corporation under the trademark Sofspan. Spandex is a manufactured fiber in which the fiber-forming substance is a long-chain synthetic polymer comprised of at least 85% of a segmented polyurethane.

It is also possible, for the production of certain particular synthetic suede products, to employ two or more additional feed materials as the inner layer. Thus, the preferred polyurethane film or sheet may be combined with the specific polyurethane materials enumerated in the preceding paragraph. Furthermore, such as additional inner layer material, which can be fed on top of the polyurethane film or sheet, may be composed of a Very fleecy web or carded polyester or cotton fibers which previously have been cut into strips of from 1 to 2 inches in length before carding and which are not joined or banded in any manner. These unbound fibers reinforce the total product assembly in such a manner so as to avoid stiffness. The thickness of such an additional layer may vary from stout 0/001 to 0.006 inch, preferably from about 0.001 to 0.002 inch.

For the manufacture of certain products the polyurethane materials used as the outer layers may be replaced by polyolefinic feed materials such as ethylene-vinyl acetate copolymers, cross-linked polyolefins, polyvinyl chloride, and the like.

While certain embodiments of this invention are discussed above, it will be understood that the invention is obviously subject to other variations and modifications without departing from its broader aspects.

What is claimed is:

1. A method of continously producing a synthetic suede product which comprises the following sequential steps:
    a. continuously feeding an assembly of at least three feed materials into a nip formed by two rotating cylinders, each of said rotating cylinders carrying a preheated, endless silicone rubber molding band the outer surfaces of which are provided with a multiplicity of cavities, the separate feed materials comprising two outer polyurethane film layers, and at least one inner layer comprising a polyurethane consisting of film sheet, web or foam;
    b. continuously compressing said assembly in said nip at a temperature of from about 385° to 410° F and at a pressure of from about 65 to 100 psi whereby the outer polyurethane film are are in a molten state, a major proportion of said molten polyurethane being forced into said cavities, and wherein the remaining portion of the outer polyurethane films and the inner layers are welded together;
    c. continuously passing the resulting composite assembly compressed between molding bands into a cold water bath maintained at a temperature sufficiently cold to solidfy any molten feed material;
    d. continuously stripping the composite assembly from the molding bands by passing the molding bands over a pair of rotating cylinders provided with an internal vacuum and gripping the composite assembly with a pair of rotating cylinders covered with card clothing which perforates the composite assembly; and
    e. continuously winding up the stripped, perforated composite assembly comprising the layered feed material having outwardly extending fibers on both surfaces thereof and constituting said synethetic suede product.

2. The method of claim 1 wherein said molding bands are preheated to a tempeature within the range of 385° to 410° F.

3. The method of claim 1 wherein said outer layer is a polyester-based thermoplastic polyurethane film.

4. The method of claim 1 wherein said inner layer is a polyester-based thermoplastic film.

5. The method of claim 1 wherein second inner layer is a polyurethane foam.

6. The method of claim 1 wherein said inner layer is preheated to a temperature of about 385° to 410° F prior to being passed into said nip.

7. The method of claim 1 wherein said outer polyurethane film layers are preheated to a temperature of from about 385° to 410° F. prior to being passed into said nip.

8. The method of claim 1 wherein said cold water bath is maintained at a temperature of from about 32° to 50° F.

9. The method of claim 1 wherein the fibrous surfaces of said stripped, perforated composite assembly are brushed prior to being wound up on the rotating cylinder.

10. A perforated synthetic suede product having the appearance and feel of natural suede leather which is characterized by polyurethane fibers extending outwardly from two outer polyurethane surface layers welded to at least one inner layer comprising a polyurethane film, sheet, web or foam.

11. The perforated synthetic suede product of claim 10 wherein said outwardly extending fibers are present in a density ranging from about 10,000 to 100,000 per square inch.

12. The perforated synthetic suede product of claim 10 wherein said outer polyrethane is a polyester based thermoplastic polyurethane.

13. The perforated synethetic suede product of claim 10 wherein said inner polyurethane is a polyether based thermoplastic polyurethane.

* * * * *